No. 785,528. PATENTED MAR. 21, 1905.
C. R. THOMPSON.
NUT LOCK.
APPLICATION FILED FEB. 8, 1904.
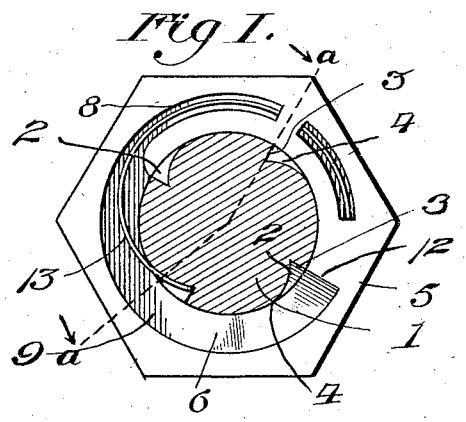
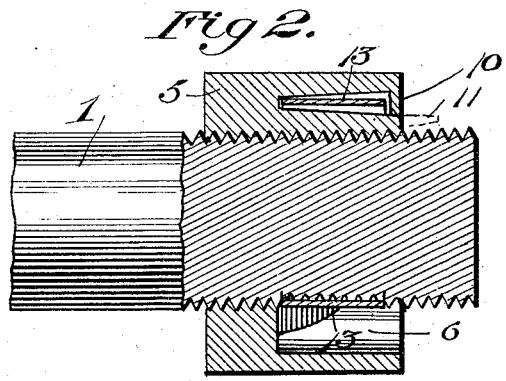
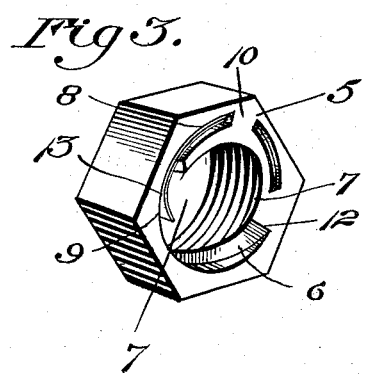
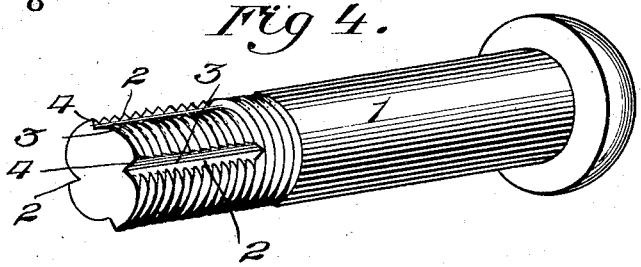
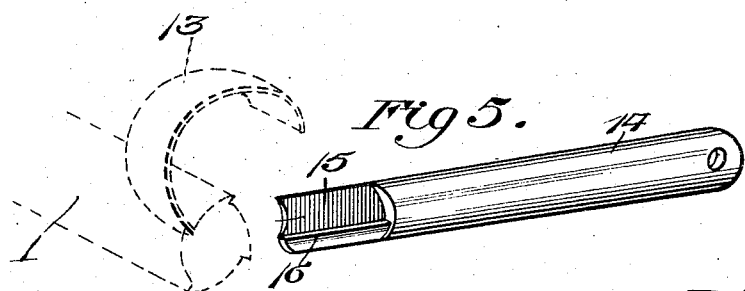
Witnesses
Phil E. Barnes
A. P. Hollingsworth
Inventor
C. R. Thompson
By Victor J. Evans
Attorney No. 785,528. Patented March 21, 1905.

UNITED STATES PATENT OFFICE.

CHARLES ROBERT THOMPSON, OF POCATELLO, IDAHO.

NUT-LOCK.

SPECIFICATION forming part of Letters Patent No. 785,528, dated March 21, 1905.

Application filed February 8, 1904. Serial No. 192,679.

*To all whom it may concern:*

Be it known that I, CHARLES ROBERT THOMPSON, a citizen of the United States, residing at Pocatello, in the county of Bannock and State of Idaho, have invented a new and useful Improvement in Nut-Locks, of which the following is a specification.

This invention relates to a nut-lock, the principal use of which is in connection with railroads for joining the ends of rails, the object being to provide a simple and efficient means for locking nuts to the bolts to prevent them from being shaken or jarred off by passing trains and to permit the locking mechanism being disengaged, so that the nut may be removed from the bolt.

To this end the invention consists of an improved nut and bolt in connection with a locking device, the novel features and arrangement of which will be herein set forth in the following description in connection with the drawings and pointed out in the claims.

In the accompanying drawings, Figure 1 represents a face view of my improved nut-lock as applied to a bolt. Fig. 2 is a sectional view of the same on the line *a a* looking in the direction indicated by the arrows. Fig. 3 is a perspective view of the nut detached. Fig. 4 is a similar view of a bolt used in connection with the nut. Fig. 5 is a perspective view of an implement for disengaging the locking device to permit the removal of the nut from the bolt.

Similar numerals of reference indicate corresponding parts in all the figures of the drawings.

The numeral 1 indicates a bolt the threaded end of which is provided for a portion of its length with a plurality of notches 2, each having a substantially radial side 3 and a curved or inclined side 4. The notches 2 may be impressed in the blank during the process of manufacture or cut in the bolt either before or after threading.

A nut 5, threaded to fit the bolt, has formed therein on its outer side, and preferably during the process of manufacture, a concentric groove or depression 6, which extends almost entirely around the bolt-hole 7. About one-half of the groove or depression 6 is narrower, as at 8, than the remainder 9, which latter part extends inwardly to the bolt-hole 7. The groove 6 preserves the same depth for the greater part of its length; but near the end of the wide portion 9 it gradually slopes upward to the face of the nut at 12. Reaching across the narrow part 8 of the depression or groove 6 is a bridge 10, preferably formed by bending an outstanding lug (shown at 11, Fig. 2, in dotted lines) across said depression and welding it to the body of the nut. Within the groove or depression 6 is placed a flat curved spring 13, concentric for the greater part of its length with the axis of the bolt, but having its operative end curved inwardly on a shorter radius to enter under tension the notches 2 on the bolt. The spring 13 is placed in the groove 6, beginning at the end 12 and carried down the aforesaid inclined surface and around the groove under the bridge as far as it will go. The nut is then screwed on the bolt, the bridge 10 preventing the spring from becoming displaced. As the nut is turned the end of the spring 13 successively enters the notches 2 until the nut reaches its limit of movement, at which time the end of the spring will rest in one of the notches on the bolt, bearing against the radial face 3 thereof, and effectually prevent a reverse movement of the nut.

At times it is desirable to remove a nut without destroying it or the bolt. For this purpose I use an implement such as is represented in Fig. 5, wherein 14 indicates the handle, and 15 the working end of the implement. The latter end is concaved on one side, (not shown,) while its opposite side is provided with a longitudinal shoulder 16, which when placed between the spring and the bolt engages the end of the spring and holds it away from the notches 2. The nut may now be readily turned and removed from the bolt.

Having thus described the invention, what is claimed as new is—

1. In a nut-lock, a bolt having longitudinal notches, combined with a nut having a concentric groove or depression in one face, said groove being narrower at one part than at another and a bridge across said narrow part, and a spring in said groove or depression beneath said bridge, one end of said spring being arranged to engage the notches in said bolt.

2. In a nut-lock, a bolt having longitudinal grooves combined with a nut having a concentric groove of different widths formed in one face thereof, the bottom of said groove being inclined upwardly at one end toward the face of said nut, a spring in said groove, and a bridge spanning the groove formed by bending a lug on the face of the nut over said groove.

3. In a nut-lock, a bolt having longitudinal grooves combined with a nut having a concentric groove formed in one face thereof, and a bridge integral with the nut extending across said groove, and a curved spring in said groove held in place by said bridge.

In testimony whereof I have signed my name to this specification in the presence of two subscribing witnesses.

CHARLES ROBERT THOMPSON.

Witnesses:
ANDREW BERTNER STEVENSON,
BENJAMIN FRANKLIN SCARBOROUGH.